(12) United States Patent
Mallepalli et al.

(10) Patent No.: US 12,028,432 B2
(45) Date of Patent: Jul. 2, 2024

(54) SYSTEM AND METHOD FOR MANAGING PUSH NOTIFICATIONS ON A USER DEVICE

(71) Applicant: JIO PLATFORMS LIMITED, Ahmedabad (IN)

(72) Inventors: Bharathkumar Reddy Mallepalli, Bangalore (IN); Kishore Sowdi, Bangalore (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/246,506

(22) PCT Filed: Mar. 29, 2022

(86) PCT No.: PCT/IB2022/052868
§ 371 (c)(1),
(2) Date: Mar. 23, 2023

(87) PCT Pub. No.: WO2022/208332
PCT Pub. Date: Oct. 6, 2022

(65) Prior Publication Data
US 2023/0396693 A1 Dec. 7, 2023

(30) Foreign Application Priority Data

Mar. 31, 2021 (IN) .............................. 202121014971

(51) Int. Cl.
*H04L 67/55* (2022.01)
*H04L 61/103* (2022.01)
(Continued)

(52) U.S. Cl.
CPC ............ *H04L 67/55* (2022.05); *H04L 61/103* (2013.01); *H04L 67/52* (2022.05); *H04L 2101/622* (2022.05)

(58) Field of Classification Search
CPC . H04L 67/55; H04L 61/103; H04L 2101/622; H04L 67/52
See application file for complete search history.

(56) References Cited

U.S. PATENT DOCUMENTS 9,219,979 B2 * 12/2015 Moldavsky ........... H04W 76/11
10,205,789 B2 * 2/2019 Pan ........................ H04L 67/52
(Continued)

OTHER PUBLICATIONS

International Search Report from International Appl. No. PCT/IB2022/052868, dated Jun. 24, 2022.

*Primary Examiner* — Chirag R Patel
(74) *Attorney, Agent, or Firm* — FINNEGAN, HENDERSON, FARABOW, GARRETT & DUNNER LLP

(57) ABSTRACT

The present invention relates to a system and method for managing push notifications on a user device. The push notifications may be sent only upon checking/identifying if the user device (associated smart extension) is within a predetermined vicinity of a home gateway network by checking whether respective MAC address entry of the user device is in ARP tables and is in active state, based on which push notifications may be triggered to the user device, wherein the MAC address may be computed and stored by the system. Alternatively, the system may determine if the user device is reachable or not by using IP address (such as ping protocol and other such methods). This facilitates a consistent, power saving along with better reliability of network-based calls or Push notifications, an enhanced user experience and other advantages by sending the push notifications only when the device is connected to home gateway network.

16 Claims, 8 Drawing Sheets

(51) Int. Cl.
*H04L 67/52* (2022.01)
*H04L 101/622* (2022.01)

(56) References Cited

U.S. PATENT DOCUMENTS

| | | | |
|---|---|---|---|
| 10,257,295 B1* | 4/2019 | Alpert | H04L 67/535 |
| 2012/0036271 A1* | 2/2012 | Patil | H04L 63/0272 |
| | | | 709/227 |
| 2014/0293872 A1* | 10/2014 | Sugita | G06F 1/1698 |
| | | | 370/328 |
| 2015/0358272 A1* | 12/2015 | Wen | H04L 67/52 |
| | | | 709/206 |
| 2017/0244798 A1 | 8/2017 | DeLuca et al. | |
| 2020/0228615 A1* | 7/2020 | Besehanic | H04L 61/2514 |
| 2020/0349580 A1 | 11/2020 | Gerling-Ospina et al. | |
| 2021/0392194 A1* | 12/2021 | He | H04L 67/55 |

* cited by examiner

SYSTEM AND METHOD FOR MANAGING PUSH NOTIFICATIONS ON A USER DEVICE

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to the field of information technology, and more particularly to method, device and computer-readable medium for managing push notifications.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In the last few decades, there has been a lot of emphasis on the effective usage of the battery especially on the battery constrained devices like mobile phones and the operating systems. Conventional techniques involve an operating system that may impose varying restrictions on the operation of set of instructions running on the devices. One such example may be include restricting continuous usage and running of voice over internet protocol (VoIP) applications, and IP Multimedia Subsystem (IMS) such as, for example, on Android and iOS platforms. The operating system may kill or deactivate the set of instructions or applications if not actively used for certain time. Upon certain duration of inactivity, on need basis there may be a need to wake up or enable application. The wakeup of the applications may be achieved through push notifications such as, for example, cloud messaging service or push notification services.

However, one typical problem that exists in the conventional techniques of push notifications includes the fact that push notifications are received on the devices even when the device is not connected to desired network. This may possibly lead in an inefficient usage, unnecessary power consumption and undesired user experience.

There is therefore a need in the art to provide a system and a method that can manage push notifications on a user device in an efficient, secure, power saving and reliable manner when the devices are connected to desired network.

OBJECTS OF THE PRESENT DISCLOSURE

Some of the objects of the present disclosure, which at least one embodiment herein satisfies are as listed herein below.

It is an object of the present disclosure to provide a system and a method for managing push notifications.

It is an object of the present disclosure to provide a system and a method for managing push notifications in an efficient manner, while ensuring effective power saving by sending of the push notifications only when the devices are connected to the desired network.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present disclosure provides a system and method for managing push notification in a user device. In an aspect, the system may include a processor, wherein the processor is operatively coupled with a memory, said memory storing instructions executable by the processor to: receive a predefined set of information associated with any or a combination of the user device and one or more networks in the vicinity of the user device and receive the predefined set of instructions to trigger one or more push notifications to be transmitted to the user device; The predefined set of information may pertain to Address Resolution Protocol (ARP) tables of the one or more networks, media access control (MAC) address of the user device or a predefined procedure to get the user device unique identity, such that the predefined procedure can be followed to know whether the user devices are connected to each other. Upon receiving the one or more push notifications, the processor may further cause the system to determine if the user device or an intended smart extension pertaining to the user device is within a predetermined vicinity of any of the one or more networks based on the received predefined set of information; and based on the determination of the user device or the intended smart extension pertaining to the user device being within the predetermined vicinity of any of the one or more networks, trigger the one or more push notifications to the user device.

In an embodiment, the control engine coupled to the transmitting device may be configured to generate the code associated with the data to be transmitted.

In an embodiment, the control engine may facilitate binarization of the code by getting the code as a symbol with each symbol corresponding to at least a 3-bit binary code by using a dictionary of predefined bits corresponding to each symbol. The control engine may further facilitate modulation of the binarized code by transforming the binarized code into an audio signal in the near-ultrasonic and ultrasonic frequency range. The bits of the binarized code may be randomized over a plurality of frequencies pertaining to said near-ultrasonic or said ultrasonic frequency range.

In an embodiment, an error correction engine pertaining to the control engine may be configured to introduce redundancy and randomize the bits associated with the code to be transmitted across time and a plurality of frequencies by applying error correction code to the code and wherein the redundant and randomized bits may be modulated into a plurality of frequencies for providing additional redundancy and minimizing errors.

The present disclosure further provides for a method for managing push notifications on a user device. The method may include the steps of receiving, at a processor, a predefined set of information associated with any or a combination of the user device and one or more networks in the vicinity of the user device, wherein the predefined set of information may pertain to Address Resolution Protocol (ARP) tables of the one or more networks, media access control (MAC) address of the user device or a predefined procedure to get the user device unique identity, such that the predefined procedure can be followed to know whether the user devices are connected to each other. And receiving the predefined set of instructions to trigger one or more push notifications to be transmitted the user device. Upon receiving the predefined set of instructions to trigger one or more push notification, the method may include the step of determining, by the processor, if the user device or an intended smart extension pertaining to the user device is within a predetermined vicinity of any of the one or more networks based on the received predefined set of information; and based on the determination of the user device or the intended smart extension pertaining to the user device being within the predetermined vicinity of any of the one or more networks, triggering, by the processor, the one or more push notifications to the user device.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
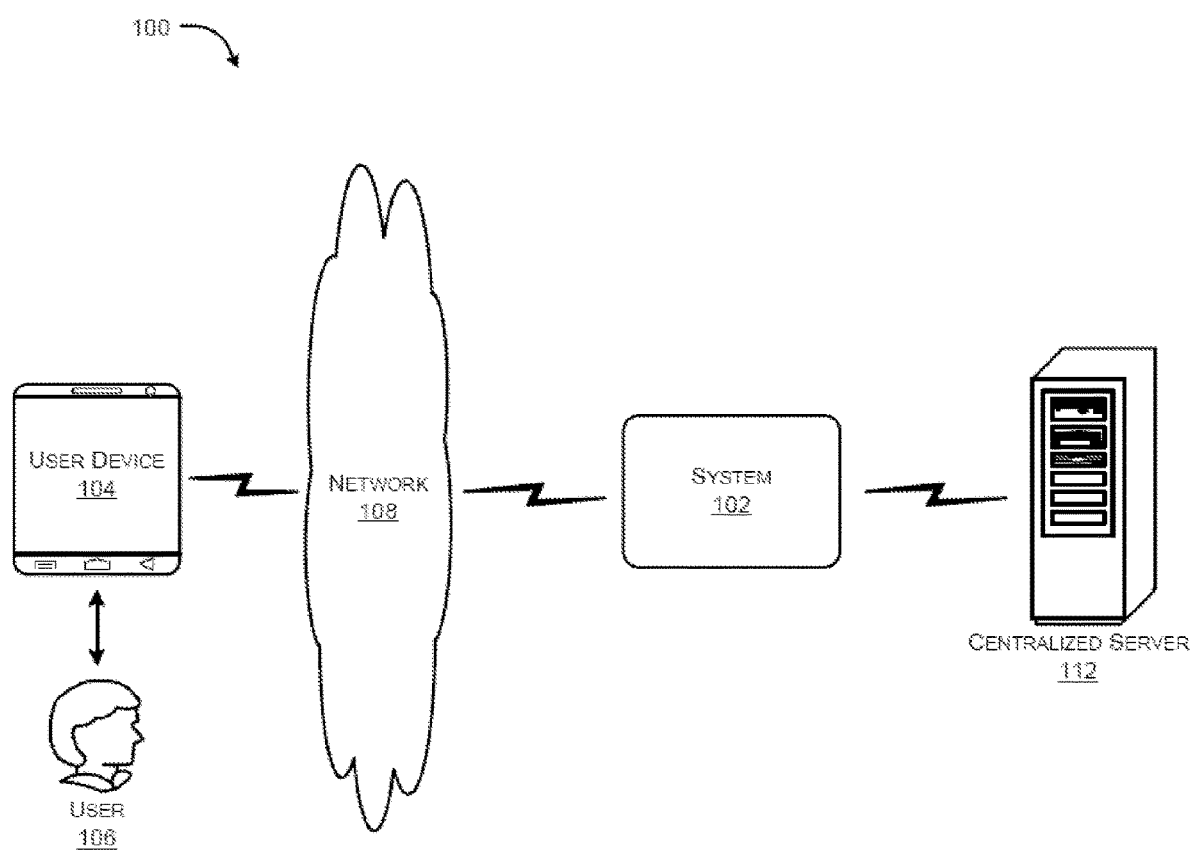
FIG. 1 illustrates an exemplary network architecture (100) in which or with which the system of the present disclosure can be implemented, in accordance with an embodiment of the present disclosure.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention provides a system and a method for managing push notifications on a user device. The present invention enables to achieve effective usage of battery and resources of the user device and/or system resources by managing push notifications only when the device is in the vicinity of a communication network such as a wireless network, a local area network, and other such network. This aspect involves triggering or activating push notifications by the system of the present invention only upon analysing and detecting connectivity of the user device to a certain close network in the vicinity. This is unique over the conventional techniques that send push notification even when the device may not be connected to a network for operation of (desired network on which the devices are supposed to receive the push notifications), for example, voice over Internet Protocol (VoIP) applications and IP Multimedia Subsystem (IMS) applications. The term "push notification" refers to an alert or an act of waking up or activating a set of instructions (such as application) from an inactive state to an active state. However, sending such push notifications irrespective of network connectivity of the user device may be a futile exercise that may also lead to unnecessary drain of power or battery and may lead to undesired user experience. In an embodiment, the system and method of the present invention ensure that the push notifications are managed based on the status of connectivity of the user device to a network such that the push notifications are sent only if connectivity to the desired network is active.

Referring to FIG. 1 that illustrates an exemplary network architecture (102) in which or with which system of the present disclosure can be implemented, in accordance with an embodiment of the present disclosure. As illustrated, the exemplary architecture includes a system (102) for managing push notifications on a user device (104) associated with a user (106). The system (102) may be associated with a backend server (112) to enable managing push notifications on the user device (104). In an embodiment, the push notifications may be managed by communication of the system (102) and/or the user device (104) with one or more push notification servers (not shown). The user computing device (104) may communicate with the system (102) or backend server via a communication network (108). In an exemplary embodiment, the system (102) may be in the form of a fixed voice stack device coupled or integrated with a home gateway, wherein the system may allow push notifications on the user device upon verifying connection of the user device to the home gateway. In an aspect, the term "home gateway" may be defined as a gateway (including hardware) that allows the connection of a local area network (LAN) to a wide area network (WAN). Various other configurations or variations of the system are possible provided the system operates or manages the push notifications based on checking vicinity of the user device to a nearby network.

The user device (104) may include a set of instructions (such as applications or an intended smart extension) that may enable operation of network based operations such as, for example, network based voice call features (such as VoIP apps/IMS apps). The set of instructions may be required to send one or more push notifications that may be required in various scenarios including, but not limited to, an incoming call, a refresh activity after predefined intervals and various such other scenarios, wherein push notifications may enable to wake up or alert/activate the set of instructions. The system (102) ensures that the push notifications are sent only upon checking/identifying if the user device or the intended smart extension pertaining to the user device (104) is within a predetermined vicinity of a close-by network including, but not limited to, wireless network (such a Wi-Fi), local area network (LAN) and other network. In an exemplary embodiment, the vicinity to a network may be determined reading Address Resolution Protocol (ARP) tables and checking media access control (MAC) address or a predefined procedure to get the user device unique identity, such that the predefined procedure can be followed to know whether the user devices are connected to each other In an embodiment, MAC address may be computed by the system. In an embodiment, when the user device (104) may register with the system, the system may compute MAC address of the user device (104) using the ARP tables from the received register request. In an embodiment, the MAC address may be computed during registration from IP address of the device. The system may store the MAC address and IP address locally such that whenever there is a need to send push notifications, the system may first check whether the stored MAC address of that user device (104) exists in the ARP table and if the MAC address is in an active state. In an alternative embodiment for managing push notifications on a user device, the system may store IP address of user device (104) and then determine if the user device is reachable or not by using IP address, wherein this step may be performed using ping protocol or any such equivalent method using IP address such that if the user device is reachable, then only the system may facilitate to trigger push notifications to the user device. In an embodiment the ping protocol may be performed by measuring round-trip time for messages sent from the originating host to a destination computer that are echoed back to source. It may be appreciated that the present disclosure may not be limited by the mentioned examples and several other embodiments are possible. In one embodiment, the user device (104) may not be in the vicinity of the home gateway network, and hence the respective MAC address entry may not be in the ARP tables. In another embodiment, it may be possible that If MAC address corresponding to the user device may exist in the ARP tables, the system may verify whether the state of MAC address is active such that if the state is not showing as active then push notifications may not be triggered for the user device (104). In yet another embodiment, it may be possible that If MAC address corresponding to the user device may exist in the ARP tables, the system may verify whether the state of MAC address is active such that if the state is showing as active then push notifications may be triggered for the user device (104). Various other such scenarios may be possible within the scope of the present disclosure.

In accordance with an embodiment and as illustrated in FIG. 1, the architecture can manage push notifications through a set of instructions on the user device (104). The user device (104) may be a portable device with operable set of instructions residing on an operating system, including but not limited to, Android™, iOS™, and the like. In an embodiment, user device (104) may include, but not limited to, any electrical, electronic, electro-mechanical or an equipment or a combination of one or more of the above devices such as mobile phone, smartphone, laptop, a general-purpose computer, desktop, personal digital assistant, tablet computer, mainframe computer, or any other computing device. The entity device (104) and/or the user computing device (110) may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the user device (104) may not be restricted to the mentioned devices and various other devices may be used.

Figure 2:
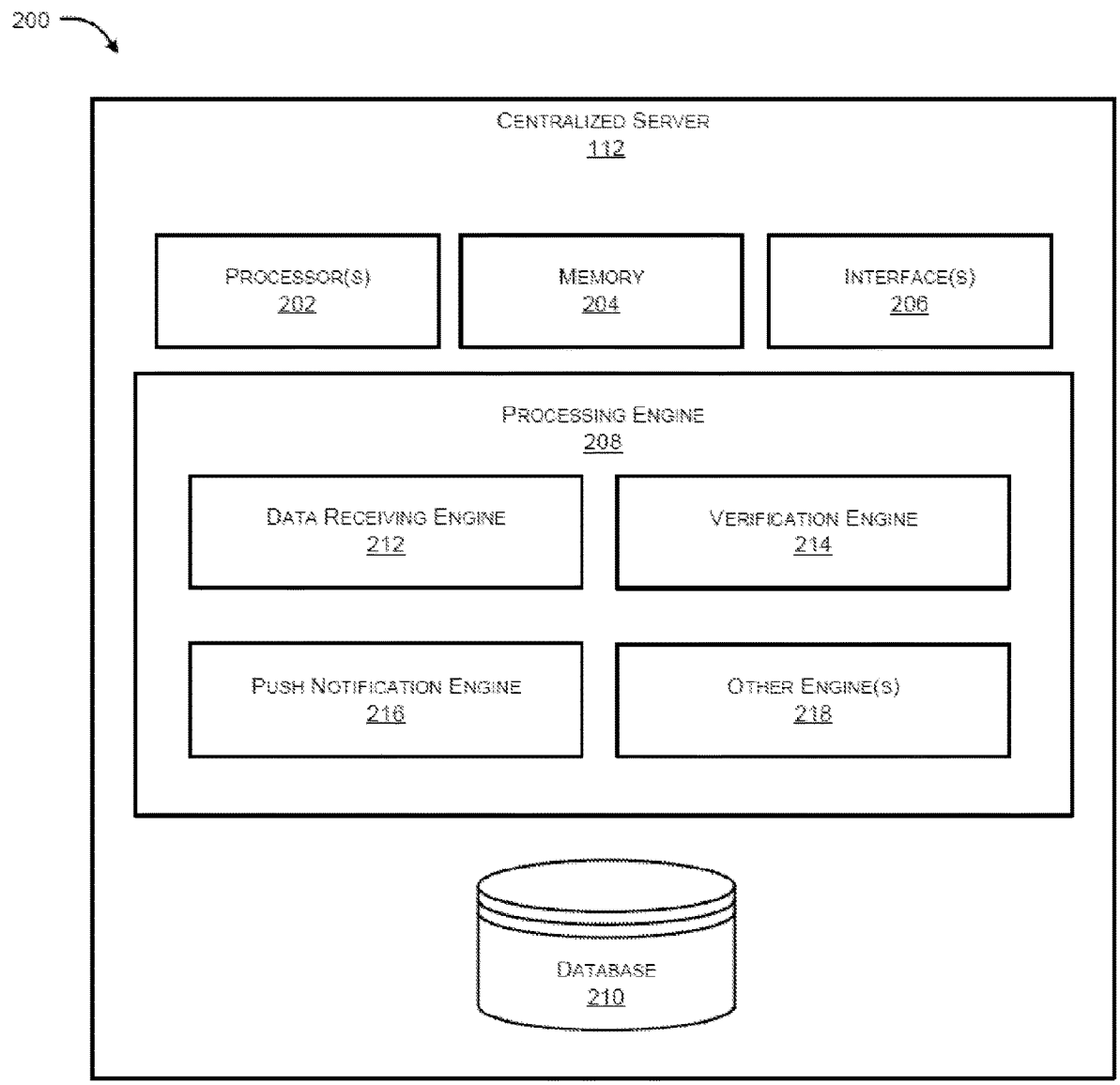
FIG. 2 illustrates an exemplary representation (200) of centralized server (112) of FIG. 1, in accordance with an embodiment of the present disclosure.

In an embodiment, the system (102) or server (112) for managing push notifications may include one or more processors coupled with a memory, wherein the memory may store instructions which when executed by the one or more processors may cause the system to manage one or more aspects of push notifications. FIG. 2 with reference to FIG. 1, illustrates an exemplary representation of the centralized server (112), in accordance with an embodiment of the present disclosure. In an aspect, the system (102) or the centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (100). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (102) or the centralized server (112) may include an interface(s) 206. The interface(s) 206 may comprise a variety of interfaces, for example, interfaces for data input and output devices, referred to as I/O devices, storage devices, and the like. The interface(s) 206 may facilitate communication of the system (102). The interface(s) 206 may also provide a communication pathway for one or more components of the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the centralized server (112) may comprise the machine-readable storage medium storing the instructions and the processing resource to execute the instructions, or the machine-readable storage medium may be separate but accessible to the centralized server (112) and the processing resource. In other examples, the processing engine(s) (208) may be implemented by electronic circuitry.

The processing engine (208) may include one or more engines selected from any of a data receiving engine (212), a verification engine (214), a push notification engine (216) and other engines (218). In an embodiment, the data receiving engine (212) may enable to receive a data related to the user device (104) such as including, but not limited to MAC address, Push Resource ID (PRID) and other such information for managing push notifications. In an embodiment, the verification engine (214) may verify aspects such as including, for example, the verification of MAC address in the ARP tables and other such information for managing push notifications. The push notification engine (216) may facilitate communication with one or more push notification servers for managing push notification based on the active state of MAC address/when the user device may be in vicinity of a home gateway network. In an embodiment, the other engines (220) may include a notification engine, authentication engine, a computing engine for computing the MAC address of the user device from ARP tables and other such engines required to accomplish one or more events for managing the push notifications on the user device. The database (210) may comprise data that may be either stored or generated as a result of functionalities implemented by any of the components of the processing engine(s) 208 of the centralized server (112). The database (210) may also enable to store history of MAC address, PRID of user device (104) and other such details.

Figure 3:
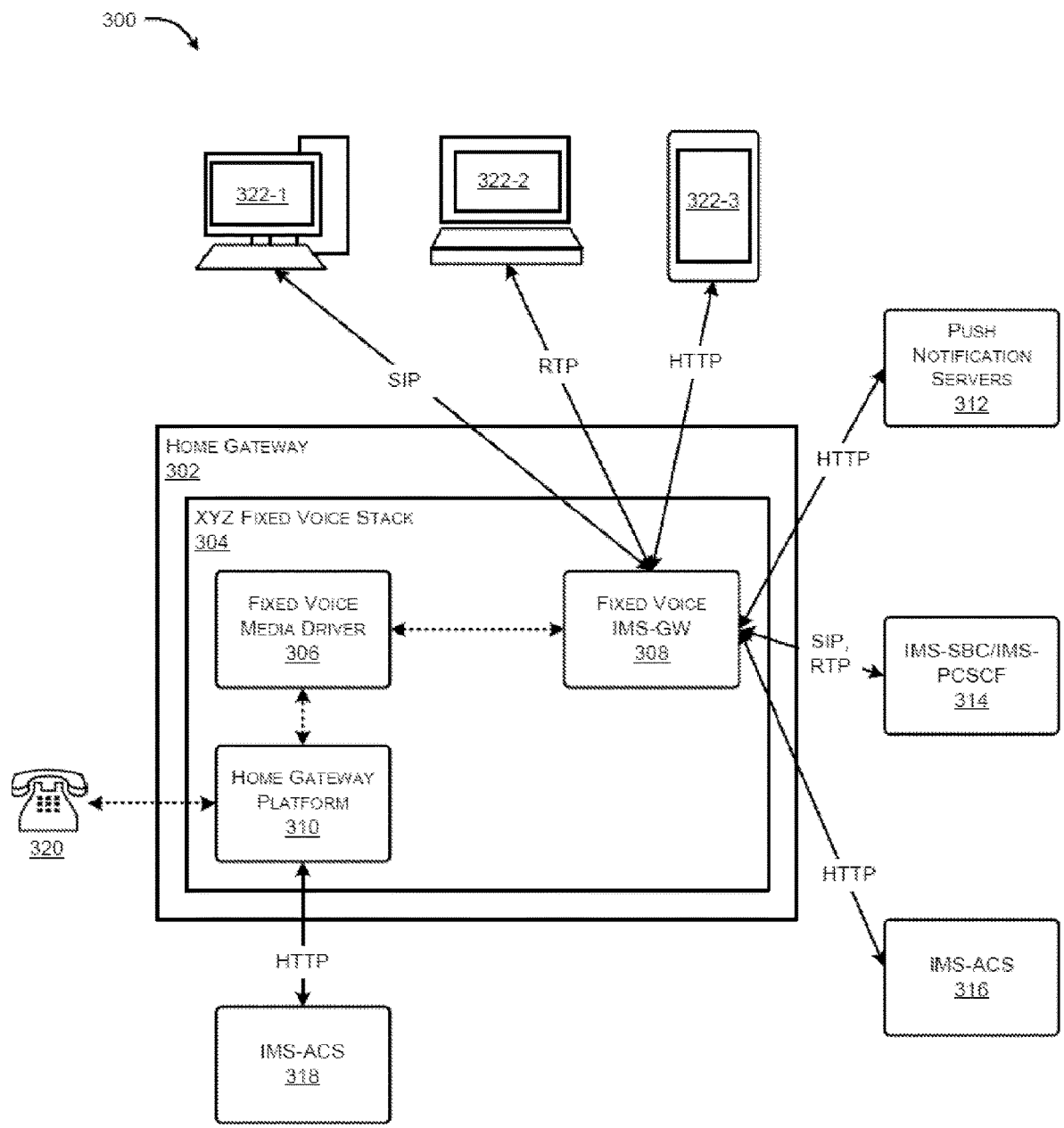
FIG. 3 illustrates a representation (300) of a system involving fixed voice system architecture, in accordance with an embodiment of the present disclosure.

FIG. 3 illustrates a representation (300) of a fixed voice system architecture, in accordance with an embodiment of the present disclosure. As shown in FIG. 3, system of the present disclosure (104 of FIG. 1) may comprise a fixed voice stack (304) on a home gateway (302) such that the fixed voice stack (304) may enable management of push notifications on a user device (herein shown as 322-1, 322-2, 322-3, collectively numbered as 322) based on whether the user device (322) is in the vicinity of the home gateway (302). The push notifications may be managed by interaction of the fixed voice stack (304) with the user device (322) through a set of instructions (or smart Extension application, hereinafter referred to as SE or ES) for operation of push notification on the user device (322). The fixed voice stack may comprise a fixed voice media driver (306), a fixed voice IP Multimedia Subsystem Gateway (IMS GW) (308), a home gateway platform (310), and other drivers/modules. In an embodiment, the home gateway platform may communicate with an IP Multimedia Subsystem-Automatic configuration Server (IMS ACS) through an application layer protocol that may include, for example, hypertext transfer protocol (HTTP). In an embodiment, the fixed voice IMS GW (308) may communicate with push notification servers (312) via an application layer protocol that may include, for example, HTTPS/TCP/UDP or any other procedure. The push notification servers (312) may communicate with the IMS GW (308) to enable alert regarding push notification services. In an embodiment, the fixed voice IMS GW (308) may communicate with IMS Session border controller (IMS SBC) (314) and/or Proxy-IMS Call Session Control Function (IMS PCSCF) (314) via a protocol that may include, for example, Session Initiation Protocol (SIP) and Real time protocol (RTP). The SIP may be designed to handle managing an incoming network based call such that SIP may enable managing RTP streams that mainly includes voice payload across network from transmitter to receiver, wherein the payload may be a continuous stream of packets that traverses the network corresponding to a network enabled voice call. In an embodiment, the fixed voice IMS GW (308) may communicate with the user device (322) via any or a combination of SIP, RTP, HTTP and other such protocols. The home gateway platform may Wi-Fi Access Points, Ethernet and other Home Gateway products pertaining to connection via device (320).

In an embodiment, the fixed voice stack (304) ensures that the push notifications are sent only upon checking/identifying if the user device (322) may be within a predetermined vicinity of the home gateway (302) including, but not limited to, a device for providing access to wireless network (such a Wi-Fi), local area network (LAN) and other network. In an exemplary embodiment, the vicinity to the home gateway may be determined reading ARP tables and checking the stored MAC address from a past registration that can include a registration procedure mechanism such as HTTP/WS/Bluetooth and the like that can carry the PRID and associated information to trigger the Push Notification. It may be appreciated that the present disclosure may not be limited by the mentioned disclosure and several other embodiments are possible. In one embodiment, the user device (322) may not be in the vicinity of the home gateway (302), the respective MAC address entry may not be in the ARP tables. In another embodiment, it may be possible that if MAC address corresponding to the user device (322) may exist in the ARP tables, the system may verify whether the state of MAC address is active such that if the state is not showing as active then push notifications may not be triggered for the user device (322). Various other such scenarios may be possible within the scope of the present disclosure.

Figure 4A:
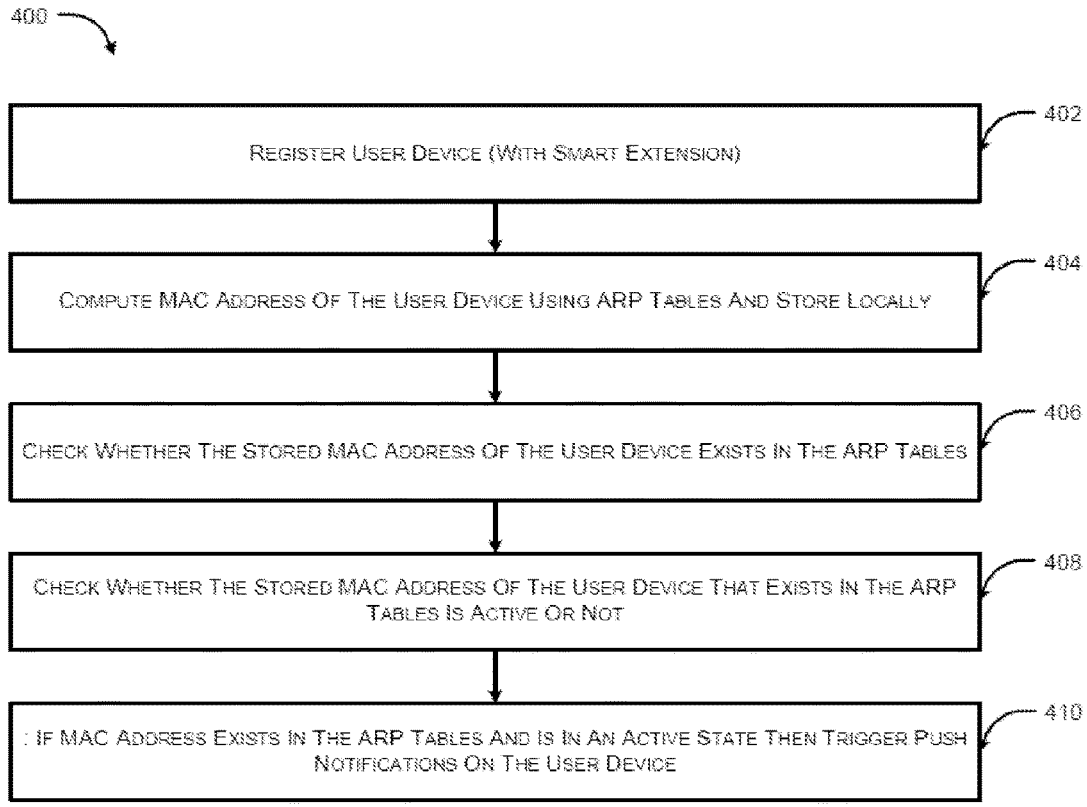
FIGS. 4A-4B illustrate flow diagrams (400 and 450) illustrating an exemplary method for managing push notifications, in accordance with an embodiment of the present disclosure.
Figure 4B:
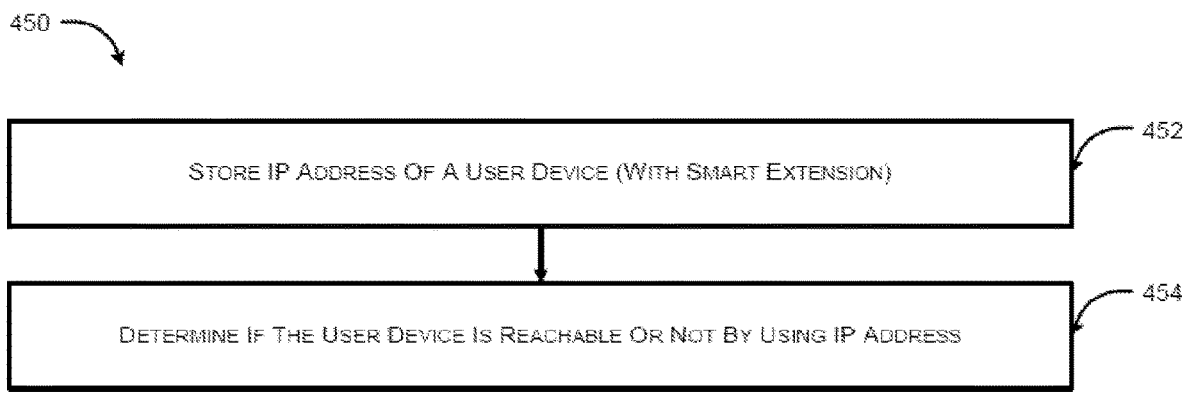

FIG. 4A illustrates a flow diagram (400) illustrating an exemplary method for managing push notifications on a user device, in accordance with an embodiment of the present disclosure. At 402, the method includes registering a user device (having smart extension) with system (fixed voice stack). In the next steps, the method includes identifying whether the user device is within vicinity of home gateway network (WIFI, LAN and other such networking medium). At 404, the method may include computing MAC address of the user device using ARP tables, wherein the MAC address is stored locally. In an embodiment, at 406, the step of determining the vicinity may be performed by looking up ARP tables and identifying if the stored MAC address is in the ARP tables or not, as the MAC address may not show in the ARP tables if the user device may not be in vicinity of the home gateway. At step 408, the method may include checking whether the stored MAC address of the user device that exists in the ARP tables is active or not. The MAC address may only show to be active or inactive only if the MAC address is seen in the ARP tables. At 410, the method may ensure that if both the above criteria are satisfied (i.e. MAC address is seen in ARP tables and is in an active state) then only the system may facilitate to trigger push notifications to the user device. FIG. 4B illustrates a flow diagram (450) illustrating an alternative exemplary method to the method of FIG. 4A, for managing push notifications on a user device, in accordance with an embodiment of the present disclosure. As illustrated in FIG. 4B, at step 452, the method may include storing IP address of a user device (having smart extension). At step 454, the method may include determining if the user device is reachable or not by using IP address, such that if the user device is reachable, then only the system may facilitate to trigger push notifications to the user device. In an embodiment, the step 454 may be performed by using ping protocol or an equivalent method using the IP address of device previously stored locally from the received register request. Various other embodiments may be possible within the scope of the present disclosure.

Figure 5A:
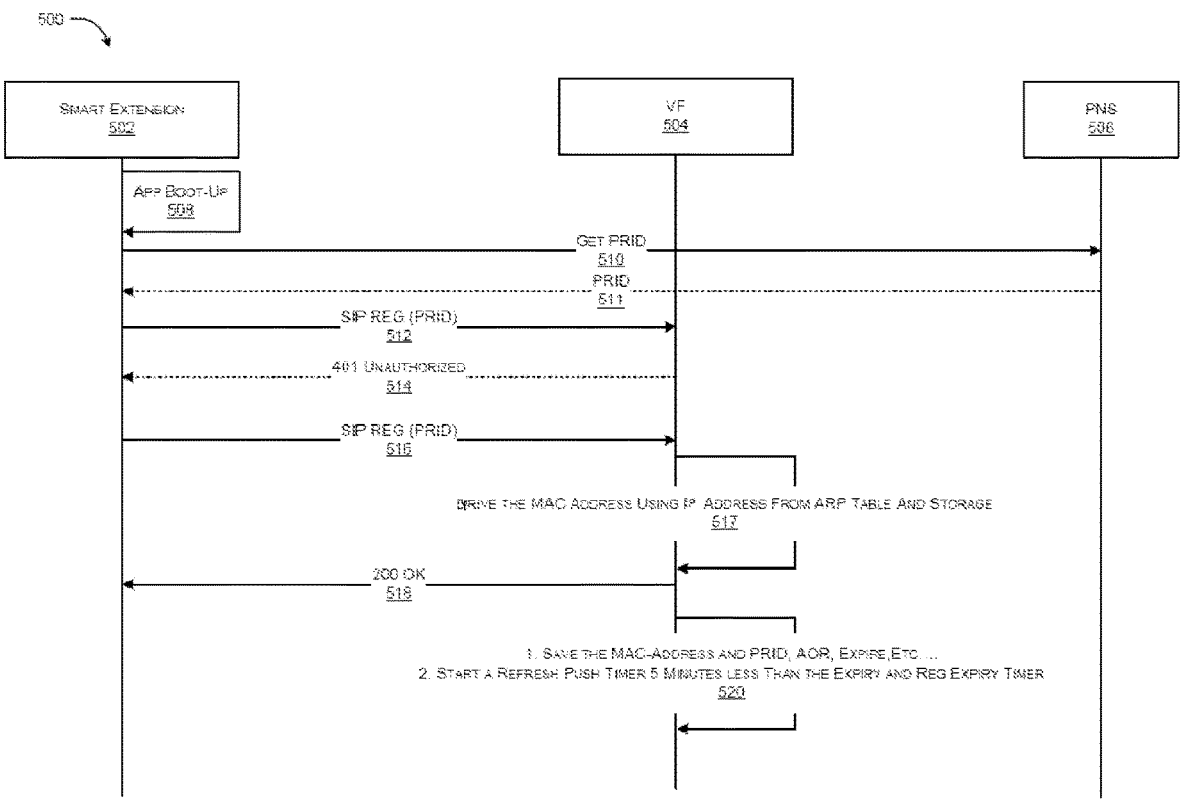
FIGS. 5A-5C illustrate a flow diagrams depicting various steps and processes involved in managing push notifications, in accordance with an embodiment of the present disclosure.
Figure 5B:
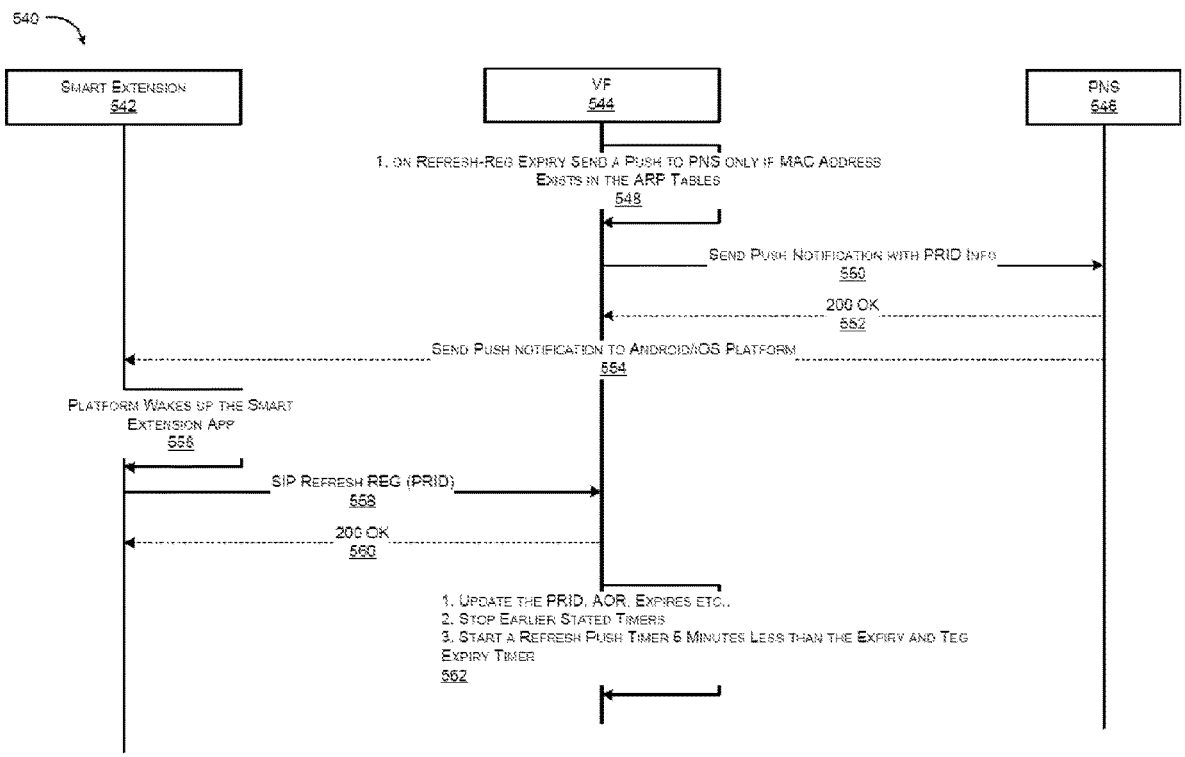
Figure 5C:
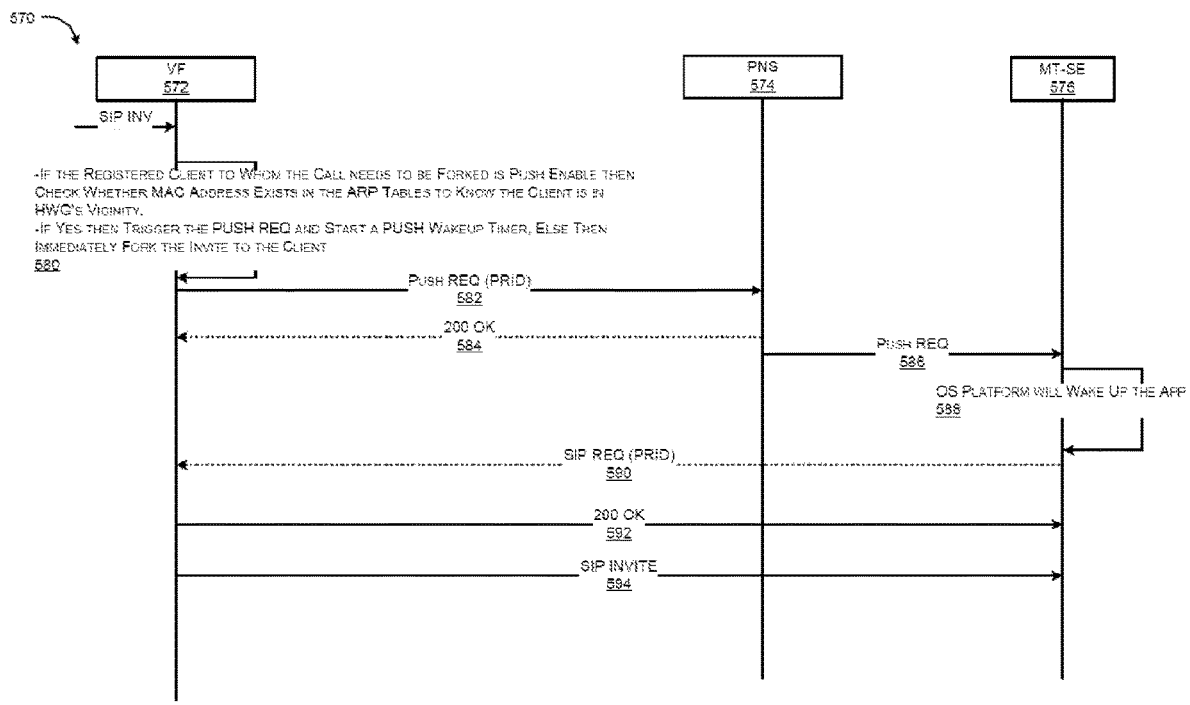

FIGS. 5A-5C illustrates a flow diagrams depicting various steps and processes involved in managing push notifications, in accordance with an embodiment of the present disclosure. In accordance with FIG. 5A and as per an embodiment, a flow diagram (500) is illustrated that depicts a process for registering a smart extension (502) for push service management, through an interaction or communication between a system in the form of a fixed voice stack (herein referred to as VF) (504) on a home gateway, the smart extension (502) that may be a set of instructions on a user device and a push notification server (PNS) (506). At 508, the set of instructions (smart extension) may boot-up or initiate. In an embodiment, the initiation may relate to a first step of registering with the system. At 510, the smart extension may send a request to the PNS (506) for receiving a unique Push Resource ID (PRID) that may be a value associated with the registration, wherein the receipt of the PRID (510) is depicted in dotted lines below 510. The fixed voice stack (VF) (504) on the home gateway, at 512, may then receive a registration request from the smart extension (502)/user device along with a set of details including, but not limited to, PRID, and other such details. At 514, the system or VF (504) may send an error statement such as, for example, a SIP 401 error indicating that the request has not been applied as it is looking for the authentication credentials. In other failure cases, appropriate SIP responses will be sent. At 516, the system VF (504) may receive another request from the smart extension on the user device. At 517, the system (504) may compute the MAC address of the device using IP address from ARP tables from the received register request, and stores MAC address and IP address locally pertaining to the user device. In an alternative embodiment, the system may store IP address of user device (104) and then determine if the user device is reachable or not by using IP address, wherein this step may be performed using ping protocol or any such equivalent method using IP address such that if the user device is reachable, then only the system may facilitate to trigger push notifications to the user device. At 518, the system will send a positive response, such as 200 OK indicating successful request, based on which further steps may be enabled. At 520, the system (504) may save the MAC address, PRID, Application owning region (AOR), expiration interval of the registration and other such details in database. At 520, the system (504) may also start a refresh push notification timer that may be set at a predefined time later than expiration timer or interval. Various other aspects are possible. The explicit predefined timer mechanism is required to trigger a wake up push before expiry of the SIP registration. As an example, but not as a limitation, if 104 registers with 102 with 3600 seconds then the predefined time could be 3000 seconds so that on 3000th second 102 will trigger Push to wakeup 104 so that 104 will send the register or refresh register request so that the registration flow will be intact In accordance with FIG. 5B and as per an embodiment, a flow diagram (540) is illustrated that depicts an interaction or communication between a fixed voice stack (herein referred to as VF) (544) on a home gateway, a smart extension (herein referred to as VF) (544) that may be a set of instructions on a user device and a push notification server (PNS) (546), wherein FIG. 5B depicts waking up the smart extension (542) by sending a push notification for push service management. At 548, the system (VF) (544), the system may send a push notification only if MAC address of the user device (on which smart extension runs) exists in the ARP tables. If the MAC address of the user device exists in the ARP tables, then at 550, the system (544) may send a push notification request to the PNS (546) along with the PRID information collected at registration. If the details are correct, then the PNS (546) may respond at 552 via a 200 OK statement that the request is acknowledged and is successful. Upon successful request, at 554 the PNS (546) may send a push notification to a platform (such as Android, iOS, and other platforms) on the user device running the smart extension (542). At 556, upon receiving the push notification, the platform on the user device wakes up or activates the set of instructions (smart extension application). At 558, the user device may refresh the SIP registration by sending a new registration request to the system (504) along with the other details (PRID and other information) as described in FIG. 5A. At 560, the request may be acknowledged as successful if the details might be correct. At 562, the system may update the PRID, AOR, expiration interval and other such aspects, followed by stopping earlier stated timers and start a refresh push timer that may be lesser by a predefined duration than expiry interval of registration and other such factors.

In accordance with FIG. 5C and as per an embodiment, a flow diagram (540) is illustrated that depicts an interaction or communication between a system in the form of a fixed voice stack (herein referred to as VF) (572) on a home gateway, a smart extension (herein referred to as SE) (576) that may be a set of instructions on a user device and a push notification server (PNS) (574), wherein FIG. 5C depicts a scenario wherein an incoming call may be received from the network at the user device. At 580, if a registered client to whom the call needs to be forked is push enable then the system (572) may check whether MAC address exists in the ARP tables to know the client is in vicinity of home gateway. If yes, then push request may be triggered and a push wakeup timer may be started, or else immediately invite to the client may be forked. At 582, a push request (for PRID) may be forwarded to PNS (574). If PRID is available (confirmed at 584) then the system may check whether MAC address exists in the ARP tables. If yes, then the push request may be triggered (at 586) and a push wakeup timer of a predefined duration such as, for example 10 seconds may be enabled (at 588). If no PRID is available (as shown in 590 and 592) then an invite may be forwarded to the smart extension (576), as shown in 594.

Figure 6:
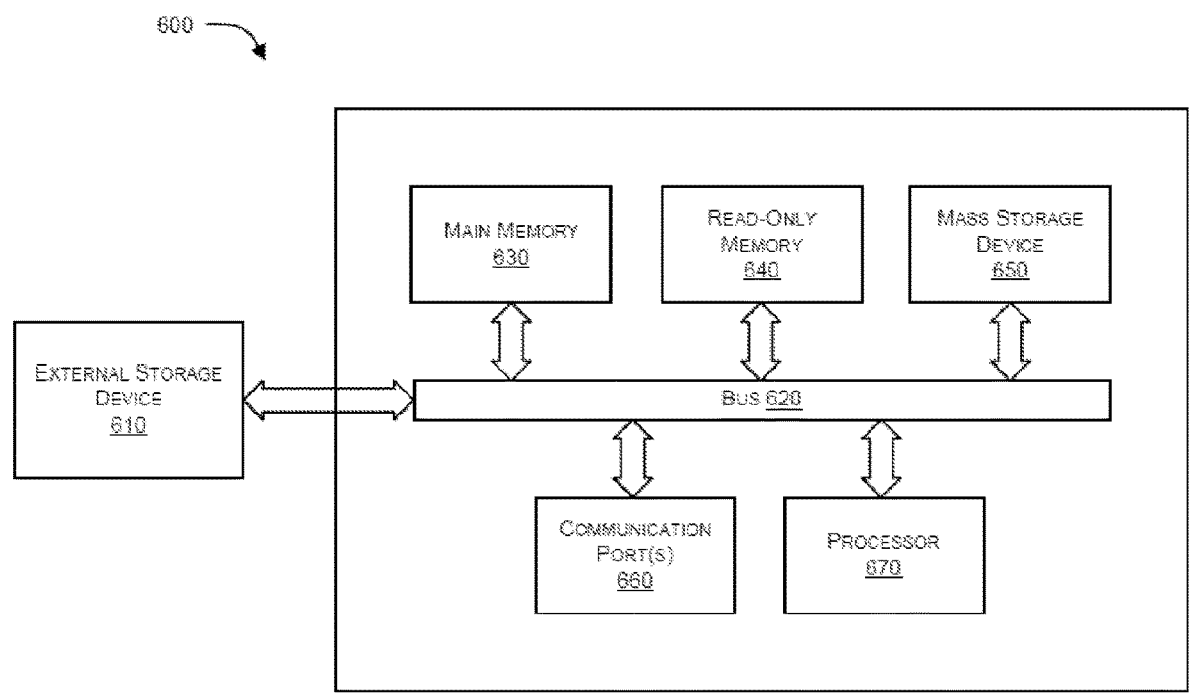
FIG. 6 refers to the exemplary computer system (600) in which or with which embodiments of the present invention can be utilized, in accordance with embodiments of the present disclosure.

FIG. 6 refers to the exemplary computer system (600) in which or with which embodiments of the present invention can be utilized, in accordance with embodiments of the present disclosure. As shown in FIG. 6, a computer system 600 can include an external storage device 610, a bus 620, a main memory 630, a read only memory 640, a mass storage device 650, communication port 660, and a processor 670. A person skilled in the art will appreciate that the computer system may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 670 may include various modules associated with embodiments of the present invention. Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects. Memory 630 can be Random Access Memory (RAM), or any other dynamic storage device commonly known in the art. Read-only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with a computer system. Other operator and administrative interfaces can be provided through network connections connected through communication port 660. The external storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, the present disclosure provides a unique and inventive solution for managing push notifications. The system and method of the present disclosure enables sending push notifications only to the devices in the vicinity of the home gateway thus enabling reliable control of sending of the push notifications only to the devices connected to the home gateway of the system, thus ensuring that the push notifications are forwarded only when connectivity is enabled. This facilitates a consistent, power saving and reliable operation along with better call reachability rate while offering better reliability of network based calls or Push notifications and an enhanced user experience, wherein the present disclosure is devoid of the disadvantages associated with the conventional systems.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides for a system and a method for managing push notifications.

The present disclosure provides for a system and a method for managing push notifications in an efficient manner, while ensuring effective power saving by sending of the push notifications only when the devices are connected to the desired network.

We claim:

1. A system for managing push notifications on a user device, said system comprising:
   a processor, wherein the processor is operatively coupled with a memory, said memory storing instructions executable by the processor to:
   receive a predefined set of information associated with any or a combination of the user device and one or more networks in the vicinity of the user device, wherein the predefined set of information pertains to Address Resolution Protocol (ARP) tables of the one or more networks and media access control (MAC) address of the user device or a predefined procedure to get the user device unique identity, such that the predefined procedure is followed to know whether the user device is connected to the one or more networks;
   receive a predefined set of instructions to trigger one or more push notifications to be transmitted to the user device;
   upon receiving the predefined set of instructions to trigger the one or more push notifications, determine if the user device or an intended smart extension pertaining to the user device is within a predetermined vicinity of any of the one or more networks based on the received predefined set of information; and
   based on the determination of the user device or the intended smart extension pertaining to the user device being within the predetermined vicinity of any of the one or more networks, trigger the one or more push notifications to the user device when the user device is connected to a desired network of the one or more networks;
   wherein the MAC address and internet protocol (IP) address are stored locally such that whenever there is a need to send the one or more push notification, the system verifies a state of the MAC address to be active if the stored MAC address of that user device exists in the ARP tables.

2. The system as claimed in claim 1, wherein upon triggering the one or more push notifications to the user device, the system transmits the one or more push notifications to the user device.

3. The system as claimed in claim 1, wherein the MAC address is computed by the processor, and wherein the processor computes the MAC address of the user device using a source internet protocol (IP) address of a received packet comprising the predefined set of instructions and the ARP tables.

4. The system as claimed in claim 1, wherein the processor is configured to receive registration details of the user device to register the user device with the system, and wherein the registration details comprise internet protocol (IP) address of the user device.

5. The system as claimed in claim 1, wherein the system determines whether the user device is reachable by using a predefined protocol such as a "ping" request and an internet protocol (IP) address of the user device, wherein the ping request uses one or more Internet Control Message Protocol (ICMP) echo request packets to send the ping request to the user device, wherein the system then waits for an ICMP echo reply in response to the ping request sent to the user device, and wherein if the user device is reachable, the system triggers the one or more push notifications to the user device.

6. The system as claimed in claim 5, wherein the predefined protocol is performed by measuring round-trip time for messages sent from an originating host to a destination user device that are echoed back to the originating host.

7. The system as claimed in claim 1, if the system verifies a state of the MAC address to be inactive when the MAC address corresponding to the user device does not exist in the ARP table, then the one or more push notifications are not triggered for the user device.

8. The system as claimed in claim 7, if the system verifies the state of MAC address is active, then the one or more push notifications are triggered for the user device.

9. A method for managing push notifications on a user device, said method comprising:
   receiving, at a processor associated with a system, a predefined set of information associated with any or a combination of the user device and one or more networks in the vicinity of the user device, wherein the predefined set of information pertains to Address Resolution Protocol (ARP) tables of the one or more networks and media access control (MAC) address of the user device or a predefined procedure to get the user device unique identity, such that the predefined procedure is followed to know whether the user device is connected to the one or more networks;
   receiving, at the processor, a predefined set of instructions to trigger one or more push notifications to be transmitted to the user device;
   upon receiving the predefined set of instructions to trigger the one or more push notifications, determining, by the processor, if the user device or an intended smart extension pertaining to the user device is within a predetermined vicinity of any of the one or more networks based on the received predefined set of information; and based on the determination of the user device or the intended smart extension pertaining to the user device being within the predetermined vicinity of any of the one or more networks, triggering, by the processor, the one or more push notifications to the user device when the user device is connected to a desired network of the one or more networks;
   wherein the MAC address and internet protocol (IP) address are stored locally such that whenever there is a need to send the one or more push notification, the system verifies a state of the MAC address to be active if the stored MAC address of that user device exists in the ARP tables.

10. The method as claimed in claim 9, wherein the method further comprises:
    upon triggering the one or more push notifications to the user device, transmitting the one or more push notifications to the user device.

11. The method as claimed in claim 9, wherein the method further comprises:
    computing the MAC address by the processor, wherein the processor computes the MAC address of the user device using the ARP tables.

12. The method as claimed in claim 9, wherein the method further comprises:
    receiving registration details of the user device to register the user device with the system, wherein the registration details comprise internet protocol (IP) address of the user device.

13. The method as claimed in claim 9, wherein the method further comprises: determining through a predefined protocol, if the user device is reachable or not by using an IP address such that if the user device is reachable, then triggering the one or more push notifications to the user device.

14. The method as claimed in claim 13, wherein the method further comprises:
    measuring round-trip time for messages based on the predefined protocol sent, wherein the round trip time is measured from an originating host to a destination user device that are echoed back to the originating host.

15. The method as claimed in claim 13, wherein the method further comprises: verifying a state of the MAC address to be inactive such that if the the MAC address corresponding to the user device is not showing in the ARP table; then the one or more push notifications are not triggered for the user device.

16. The method as claimed in claim 15, wherein the method further comprises: if the state of MAC address is active, then the one or more push notifications are triggered for the user device.

* * * * *